Dec. 31, 1940.  C. E. NELSON ET AL  2,226,572
ADJUSTABLE IMPLEMENT SUPPORT
Filed Feb. 4, 1939  2 Sheets-Sheet 1
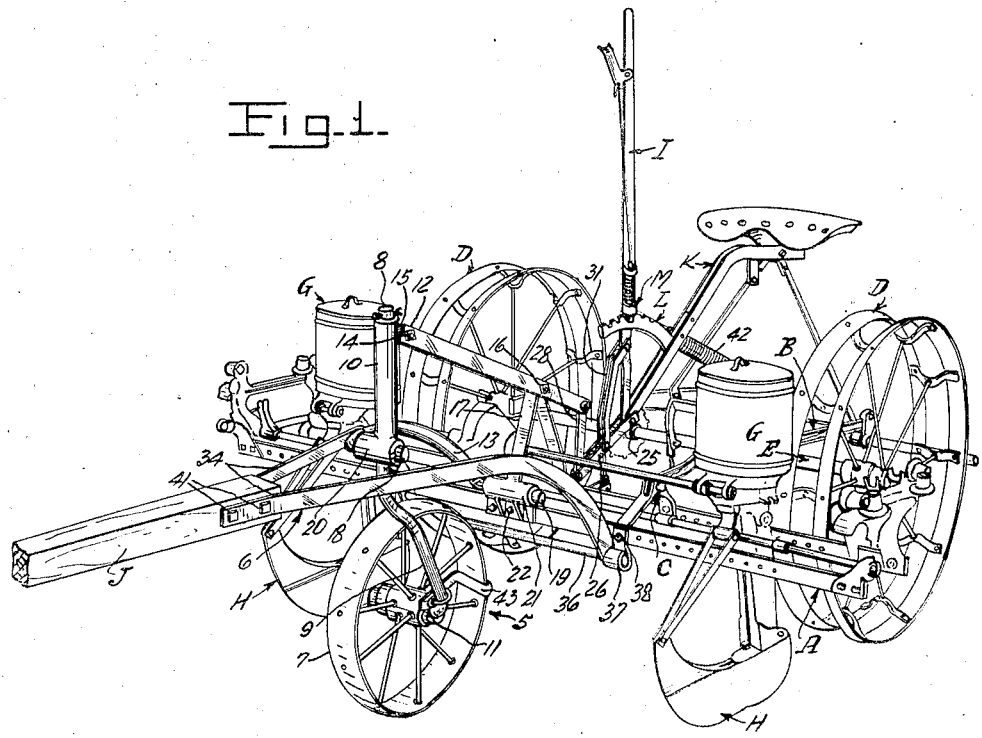
Inventors
CHARLES E. NELSON
EASBORN RUSCO
By Carlsen + Hagle
Attorneys Patented Dec. 31, 1940

2,226,572

UNITED STATES PATENT OFFICE 2,226,572

ADJUSTABLE IMPLEMENT SUPPORT

Charles E. Nelson and Easborn Rusco, Moline, Ill., assignors to Minneapolis-Moline Power Implement Company, Minneapolis, Minn., a corporation of Delaware Application February 4, 1939, Serial No. 254,621

4 Claims. (Cl. 97—236)

This invention relates to adjusting mechanisms for wheeled implements having tool supporting frames, and the primary object is to provide a novel, efficient, and practical device for supporting and vertically adjusting the tool carrying part of the frame independently of other supporting wheels, and also independently of the draft tongue which, in the case of planting machines such as here illustrated, have almost invariably been employed to both support and stabilize the implement frame.

Another object is to provide a wheeled support of this kind in which connection to the implement is made by links or levers in such manner that vertical adjustment may be made without materially disturbing the normal horizontal equilibrium of the implement or the part thereof carried by the support.

A further object is to incorporate the improved adjustable support unit in an implement to which a draft tongue is pivoted for freedom of movement in a vertical plane but which tongue cannot swing transversely without also turning the implement and therefore retains its steering or guiding function while in no way interfering with the supporting function of the unit or implement frame adjustments with respect thereto.

A further object is to provide an assembly of this kind embodying as the supporting means, per se, a caster wheel, but with said wheel supported for relative vertical adjustment about pivot connections, thus avoiding the difficulties of wear, binding, and lubrication involved in slidably supported caster wheels such as previously used in structures with which we are familiar.

These and other more detailed and specific objects, particularly as applied to corn planters, will be disclosed in the course of the following specification, reference being had to the accompanying drawings, in which—

Fig. 1 is a perspective view of a corn planter equipped with our invention and showing also an effective tongue connection for such machine.

Fig. 2 is an enlarged plan view of a frontal and medial section of the machine, showing the support, the tongue, and adjacent and connected parts of the machine itself.

For purposes of exemplification the support is herein shown and described in connection with a corn planter, but it is understood that our invention may be used as well with other types of implements or vehicles where corresponding problems are involved.

Figure 3:
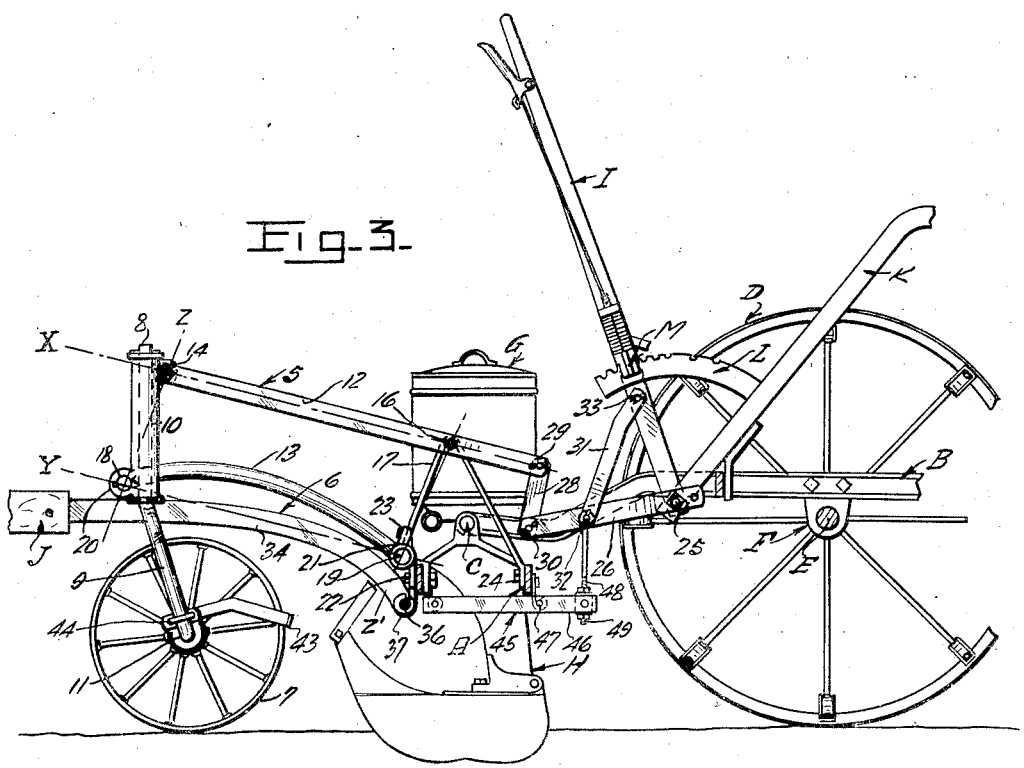
Fig. 3 is an enlarged vertical longitudinal section through the machine showing the frame lowered to support the planter shoes in operative position.
Figure 4:
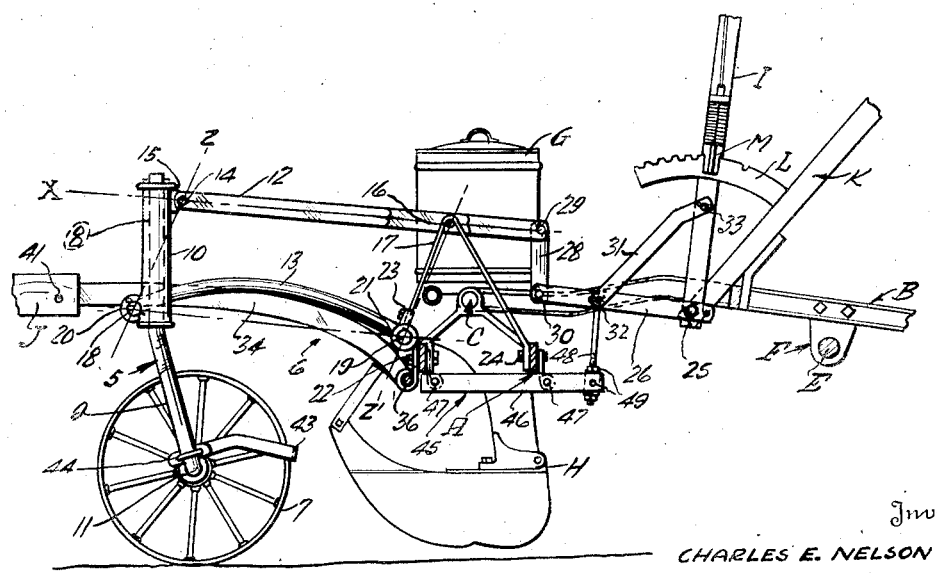
Fig. 4 is a similar view but with certain parts omitted and showing the frame in raised position.

Referring now more particularly and by reference characters to the drawings, a check row type of corn planter is illustrated which includes the frames A and B pivotally connected at C and supported rearwardly by large ground wheels D, the axle E of which forms a pivotal point at F upon which the rear frame B may rock to raise and lower the connected forwardly disposed frame A. The frame A, hereinafter termed the tool frame, carries the seed cans G and seed dropping boot assemblies H, as well as other drive and control elements, and the purpose of such raising and lowering of the frame is, of course, to adjust the seed boots to working or transport positions (Figs. 3 and 4). This operation is usually carried out by a hand lever I, and other connected parts generally including a foot pedal (not shown).

For draft purposes a long tongue J is employed for the horse drawn implement, while for tractor drawn work a short tongue or hitch is used instead, but in either case it is desirable to support the frontal end of the implement in some manner so that "neck weight" or the weight of this vertically adjustable frontal end portion of the machine will be removed from the tongue or hitch. Such supporting means may then be used as a bearing point or base upon which the frontal end of the frame may be raised and lowered to correspondingly adjust the planter shoes or other tools, and for this purpose the support, or its connection to the implement, must be adjustable. Hitherto various assemblies for this purpose have been devised but all with which we are familiar have been deficient in some respect. For example, one type has employed a caster wheel support slidably mounted in a tubular supporting element and which by the very nature of its construction is objectionable as being subject to undue wear and binding of the sliding parts. Other assemblies have employed separate tongue trucks but have required the connection of the draft tongue or hitch to the truck itself rather than to the implement directly, thus making it very difficult to secure a transversely fixed but vertically flexible tongue connection for proper draft and steering. The problems of suitable support and tongue connection as set out are not indigenous to corn planters alone, but are met with in other implements also.

Our invention resides therefore in the support frame and assembly designated generally at 5, and in the tongue connection 6 made possible by use of said support assembly, and these parts will now be described in detail.

For the support or ground engaging element, per se, a caster wheel 7 is conveniently employed and the same is connected for swiveling or castering action about a substantially upright axis by journaling the upper end 8, of its carrier standard 9, in an upright, tubular swivel bearing or sleeve 10 as shown, the said standard being offset laterally to fit the axle bearing 11 of the wheel and also to dispose the wheel immediately beneath said sleeve. This sleeve is in turn adjustably connected with the frontal, center portion of the implement by means of a frame made up of upper and lower links or arms 12 and 13 pivotally connected to said sleeve and to the frame A to permit vertical adjustment of the parts to be made, as will be described.

The upper arm 12 is made up of two parallel bars, and is pivotally connected at its frontal end at 14 to a lug 15 at the upper rear portion of the sleeve 10 and is fulcrumed adjacent its rear end by a transverse bolt 16 at the upper end of an inverted V-shaped bracket 17 supported from frame A. The lower arm 13 may be formed of round stock bent at right angles at its ends to form front and rear journal portions or trunnions 18 and 19, the frontal one of which is journaled in a sleeve bearing 20 welded or secured transversely to a lower frontal portion of the sleeve 10. The rear end 19 is similarly journaled in a bearing 21 secured by bolts 22 to the frontal transverse member of frame A in the same medial and longitudinal plane as said bearing 20. This bearing 21 carries a lug 23 to which the front leg of the bracket 17 is secured, while the rear leg thereof is secured at 24 to the rear transverse member of frame A, as clearly shown.

The arrangement of the parts is such that parallel lines X and Y intersect the pivot points 14—16 and 18—19 of the upper and lower arms 12 and 13 while parallel lines Z and Z' intersect the front and rear pivot points 14—18 and 16—19 so that the assembly thus constitutes and acts as a parallel lever mechanism.

The hand lever I is pivoted at 25 on the rear frame B, preferably to the lower end of the seat supporting beam K, and plays over a quadrant L in any position on which it may be locked by the usual latch assembly M. A rocking lever 26 is also pivotally mounted by its rear end at 25 on the same axis and extends forwardly beneath the rearwardly extended end of the upper supporting arm 12 to which it is connected by a link 28 pivotally connected at 29 and 30 at its ends to said arm and lever. From an intermediate point on the rocking lever 26 an operating link 31 is extended to the hand lever I and to which said link is connected by the pins 32 and 33. The lever 26 and link 31, like the upper supporting arm 12, are also formed of spaced flat bars, as clearly shown. The frame A and associated parts are initially adjusted and leveled for proper checking by the assembly shown at 45 and thereafter this assembly acts as a part of the entire linkage system to aid in maintaining the parts in proper relative positions as they are adjusted. Said assembly 45 comprises spaced bars 46 pivotally connected at 47 to the bars of the frame A and an eye bolt 48 which is pivotally connected to pin 32 and adjustably and pivotally connected at 49 to the rear ends of said bars 46, as shown.

The tongue J is provided with an attaching fork made up of rearwardly diverging bars 34 which are secured at their rear ends 35 to a shaft or rod 36 extended transversely and horizontally at the frontal medial end of the tool frame A and which is journaled at its ends in brackets or bearings 37 secured at 38 to the frontal cross member of the frame. The bars 34 are so spaced that they clear all working parts of the support assembly 5 and, if desired, additional inner bars 39 may be welded to the bars 34 and extended in parallelism back to the shaft 36 to which they are secured at 40. The frontal ends of the bars 34 are secured as by bolts 41, to the rear of the tongue J. The inner bars 39 are omitted in Figs. 1, 3, and 4 for the purpose of clarity.

A spring may be attached to the hand lever I to aid in lifting the frontal portion of the machine by said lever. A scraper 43 is provided for the caster wheel 7 and is supported from the member 9 by the U-bolt 44.

In operation the movement of the hand lever I forward causes the operating link 31 to urge the forward end of the rocking lever 26 downwardly to lower the link 28 and cause the rear end of the upper supporting arm 12 to descend. This action causes the tool frame A to lower, moving on its pivotal support C and on the caster wheel 7 as a forward support, and the planting shoes H are thus lowered to working position, as in Fig. 3. Movement of the lever I rearwardly reverses this operation, causing the frame A to be elevated as in Fig. 4. In both cases the support provided by the caster wheel 7 acts as bearing about which adjustments of the tool frame A may be carried out, while the rear frame B acts as a base from which raising and lowering leverage may be applied to the supporting arms for adjusting the movable portion of the frame. The relative horizontal equilibrium or alignment of the tool frame will remain substantially undisturbed as it is raised and lowered, due to the parallel-leverage system and operations of the arms 12 and 13 making up the forward frame, and the normal tendency of the tool frame to incline either forwardly or rearwardly as it is raised and lowered will be counteracted by the action of the arms 12 and 13 and the rocking movement of the caster wheel assembly. In the particular implement shown, this feature results in the tool frame A and its associated seeding, checking, and other control mechanisms maintaining a level position at any height to which it may be adjusted.

The foregoing adjustments take place without in any way disturbing the tongue J except as to such minor raising and lowering thereof as may occur, and the tongue connections at all times remain fixed with respect to the machine frames and in condition for proper draft. At the same time the caster wheel serves to remove all, or substantially all, neck weight from the tongue as desired.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. An agricultural implement comprising three frames arranged one behind the other, supporting wheels for the rear frame, tools carried by the intermediate frame, the said rear and intermediate frames being pivotally connected on transverse axes for raising and lowering said intermediate frame in response to tilting movement of the rear frame about the axis of its supporting wheels, the forwardly arranged frame comprising vertically spaced arms, a caster wheel mechanism supporting the forward ends of the arms, and the said arms having vertically spaced pivotal connections at their front and rear ends with said caster wheel mechanism and intermediate frame respectively, and a draft device connected to, and supported at its rear end by, the intermediate frame.

2. In a planter, a pair of frames arranged one behind the other, supporting wheels for the rear frame, tools carried by the forward frame, a supporting frame comprising a pair of vertically spaced arms pivotally connected to the tool carrying frame and forwardly extended therefrom, a caster wheel mechanism including an upright bearing member pivotally connected to the forward ends of the arms, and a draft tongue including rigid members pivotally connected on transverse axes to the tool carrying frame and supported thereby for vertical movement independently of the said arms and caster wheel mechanism.

3. In a planter, forward and rear frames, supporting wheels for the rear frame, planting units carried by the forward frame, a bracket device on the forward frame, a supporting frame comprising vertically spaced arms pivotally connected to said bracket device and forwardly extended therefrom, a caster wheel, an upright bearing member for the caster wheel, the said arms being pivotally connected at their forward ends to the bearing member, and a draft tongue pivotally connected to the said forward frame and movable independently of the said arms and bearing member.

4. In a planter, forwardly and rearwardly arranged frames, supporting wheels for the rear frame, planting units carried by the forward frame, a supporting frame comprising vertically spaced, fore and aft extended arms pivotally connected at vertically spaced points at their rear ends to said forward frame, a caster wheel, an upright bearing member for the wheel, the forward ends of the arms being connected by vertically spaced pivot connections to said bearing member, a draft device, rigid connecting members rearwardly extended from the draft device at opposite sides of the caster wheel and arm structure, and the rear ends of said connecting members being connected on transverse pivot axes to the forward frame for support thereby and movement independently of the wheel and arm structure.

CHARLES E. NELSON.
EASBORN RUSCO.